US008657376B2

(12) United States Patent  
Gagnon et al.

(10) Patent No.: US 8,657,376 B2  
(45) Date of Patent: Feb. 25, 2014

(54) LINK MEMBER FOR MOTION-ENABLED MOVIE THEATRE CHAIR

(75) Inventors: Stéphane Gagnon, Rosemère (CA); Jean-François Ménard, Boucherville (CA); Steve Boulais, St-Jean-sur-Richelieu (CA); Sylvain Trottier, St-Lambert (CA)

(73) Assignee: D-Box Technologies Inc., Longueuil (CA)

( * ) Notice: Subject to any disclaimer, the term of this patent is extended or adjusted under 35 U.S.C. 154(b) by 249 days.

(21) Appl. No.: 13/070,332

(22) Filed: Mar. 23, 2011

(65) Prior Publication Data

US 2011/0170945 A1 Jul. 14, 2011

Related U.S. Application Data

(63) Continuation-in-part of application No. 12/249,919, filed on Oct. 11, 2008, now Pat. No. 7,934,773.

(51) Int. Cl.
 *A47C 1/00* (2006.01)
(52) U.S. Cl.
 USPC .................. 297/329; 297/322; 297/344.11
(58) Field of Classification Search
 USPC .............. 297/217.3, 313, 314, 322, 325, 329, 297/344.11, 344.15, 344.16
 See application file for complete search history.

(56) References Cited

U.S. PATENT DOCUMENTS

| 3,577,655 | A |  | 5/1971 | Pancoe |
| 3,645,011 | A |  | 2/1972 | Callanen |
| 3,923,300 | A |  | 12/1975 | Tanus |
| 4,066,256 | A |  | 1/1978 | Trumbull |
| 5,009,412 | A |  | 4/1991 | Roodenburg et al. |
| 5,022,384 | A |  | 6/1991 | Freels et al. |
| 5,022,708 | A |  | 6/1991 | Nordella et al. |
| 5,401,269 | A | * | 3/1995 | Buttner-Janz et al. ..... 623/17.15 |
| 5,496,220 | A |  | 3/1996 | Engstrand |
| 5,545,040 | A | * | 8/1996 | Lu ................................. 434/58 |
| 5,605,462 | A |  | 2/1997 | Denne |

(Continued)

FOREIGN PATENT DOCUMENTS

WO WO2007135551 11/2007

OTHER PUBLICATIONS

ISR.
Written Opinion.

*Primary Examiner* — Sarah B McPartlin
(74) *Attorney, Agent, or Firm* — Norton Rose Fulbright Canada LLP

(57) ABSTRACT

The present document describes a link member for providing an interface between an actuator and a seat base. The link member has a translational degree of freedom and at least two rotational degrees of freedom. The link member comprises: a joint member having a spherical surface, the joint member for attachment to one of the actuator and the seat base; a housing for attachment to the other one of the actuator and the seat base; and a slider mounted on the spherical surface and within the housing. The slider is free to move in a direction of a translational plane within the housing thereby providing the translational degree of freedom. Furthermore, the slider is free to slide on the spherical surface and to pivot about a first axis and a second axis thereby providing the at least two rotational degrees of freedom.

16 Claims, 10 Drawing Sheets

(56) References Cited

U.S. PATENT DOCUMENTS

| | | |
|---|---|---|
| 5,678,889 A | 10/1997 | Purcell |
| 5,954,508 A | 9/1999 | Lo et al. |
| 6,056,362 A | 5/2000 | de la Haye |
| 6,113,500 A * | 9/2000 | Francis et al. ............ 472/60 |
| 6,162,058 A | 12/2000 | Yang |
| 6,396,462 B1 | 5/2002 | Mead, Jr. et al. |
| 6,413,090 B1 | 7/2002 | Shiina et al. |
| 6,733,293 B2 | 5/2004 | Baker et al. |
| 6,793,495 B2 | 9/2004 | Kang |
| 7,382,830 B2 | 6/2008 | Kondo et al. |
| 2003/0134676 A1 | 7/2003 | Kang |
| 2005/0277092 A1 | 12/2005 | Hwang |
| 2006/0046230 A1 | 3/2006 | MacDonald |
| 2006/0241767 A1 * | 10/2006 | Doty ............ 623/17.12 |
| 2008/0009776 A1 | 1/2008 | Trandafir |
| 2010/0090507 A1 | 4/2010 | Boulais et al. |

\* cited by examiner

LINK MEMBER FOR MOTION-ENABLED MOVIE THEATRE CHAIR

CROSS-REFERENCE TO RELATED APPLICATIONS

This application is a continuation-in-part of U.S. application Ser. No. 12/249,919 filed Oct. 11, 2008.

TECHNICAL FIELD

This description relates to the field of motion-enabled chairs. More particularly, this description relates to actuation of movie theatre seats.

BACKGROUND

Prior art systems include motion simulators and motion chairs used in homes, in video game arcades and in attraction park rides.

There is a need to introduce the technology of providing motion in seats installed in movie theatres. In the context of a movie theatre, restrictions relative to the space occupied by each individual seat are present and need to be overcome.

SUMMARY

According to an embodiment, there is provided a link member for providing an interface between an actuator and a seat base. The link member has a translational degree of freedom and at least two rotational degrees of freedom. The link member comprises: a joint member having a spherical surface, the joint member for attachment to one of the actuator and the seat base; a housing for attachment to the other one of the actuator and the seat base; and a slider mounted on the spherical surface and within the housing. The slider is free to move in a direction of a translational plane within the housing thereby providing the translational degree of freedom. Furthermore, the slider is free to slide on the spherical surface and to pivot about a first axis and a second axis thereby providing the at least two rotational degrees of freedom.

According to another embodiment, there is provided a link member for providing an interface between a first part and a second part. The link member has a translational degree of freedom and at least two rotational degrees of freedom. The link member comprises: a joint member having a spherical surface, the joint member for attachment to the first part; a housing for attachment to the second part; and a slider mounted on the spherical surface and within the housing. The slider is free to move in a direction of a translational plane within the housing thereby providing the translational degree of freedom. Furthermore, the slider is free to slide on the spherical surface and to pivot about a first axis and a second axis thereby providing the two rotational degrees of freedom.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
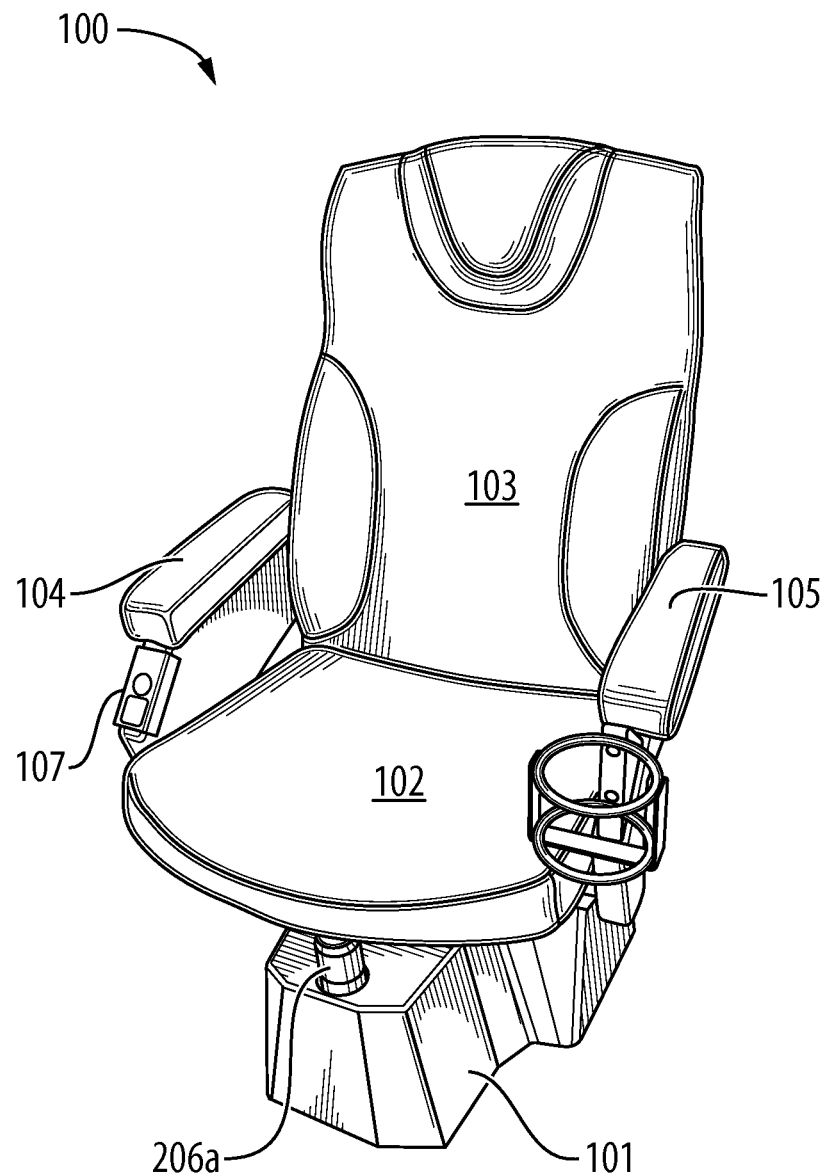
FIG. 1 is a perspective view of a chair according to an embodiment.
Figure 2:
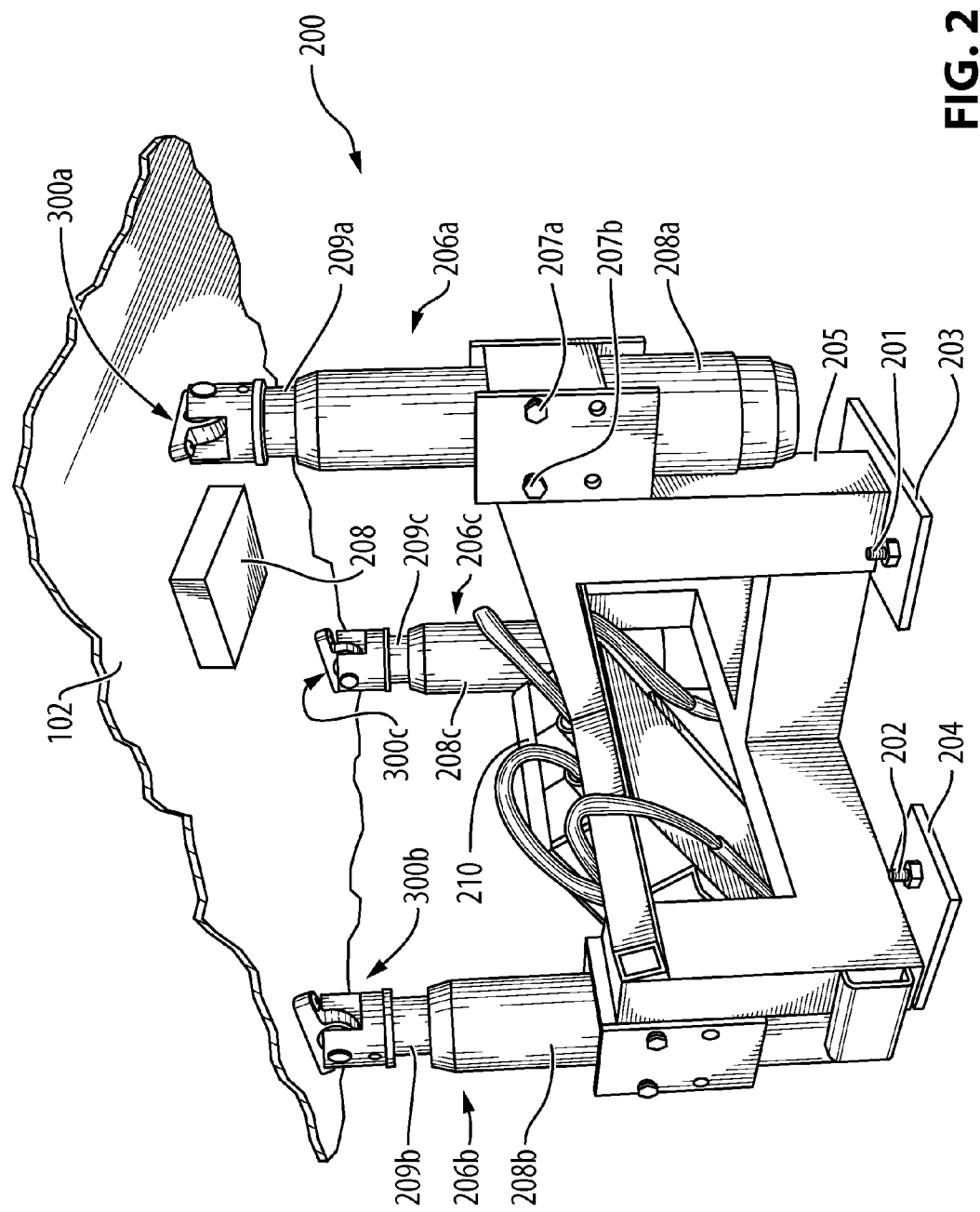
FIG. 2 is a perspective view of an actuated base according to an embodiment.

Referring to the drawings, and more particularly to FIGS. 1 and 2, an actuated movie chair 100 (FIG. 1) is shown. The base 200 (FIG. 2) of the chair 100 lies on the ground and is covered by a protective cover 101. The seating portion of the chair 100 is very similar to a standard movie chair or seat and comprises a seat base 102, a backrest 103 and armrests 104-105. Although the chair 100 shown in FIG. 1 is designed for one user/movie viewer, it is understood that the concepts described herein extend to multi-user chair as well.

Between the protective cover 101 and the seat base 102 there may be a protection skirt (not shown) for preventing users from injury while viewing a moving which comprising motion effects. According to an embodiment, the terms "protective cover" includes the protection skirt. The protection skirt is horizontally wrinkled and made of flexible material to adjust itself during the actuating (movement of the chair).

Below the right armrest 104, a control panel 107 is accessible to the user for controlling the intensity (e.g., the amplitude range of the actuators 206a-b-c) of the motion effect inducing in the chair 100. Some of the options (i.e., modes of operation) include "Off" (i.e., no motion), "Light" (i.e., reduced motion), "Normal" (i.e., regular motion), "Heavy" (i.e., maximum motion), "Discreet" (i.e., fully controllable motion level between "Off" and "Heavy"), and "Automatic". Optionally, a vibration signal, a sound signal or light signal is provided to the user to indicate in which mode of operation or at which intensity level the chair 100 is operating.

In the "Automatic" mode, the chair 100 uses a sensor (not shown) to detect a characteristic of the user (e.g., weight) and, based on the characteristic, determines the setting for the level of motion that will be induced in the chair 100. The sensor function can be achieved by a combination of feedback through one or more actuators 206a-b-c and software algorithm hosted in the processor (not shown) of the controller 210. The weight sensor function can also be achieved by using a separate sensor 208 (see FIG. 2) installed on the chair 100. Sensor 208 is in communication (wired or wireless) with the controller 210 to determine, using a software algorithm, a characteristic of the user. The control panel 107 is therefore in communication with the controller 210.

Referring to FIG. 2, there is shown an actuating base 200 anchored to the floor using bolts 201-202 via anchor points (not visible) through anchor plates 203-204 (and another anchor plate which is not visible). Anchor plates 203-204 are fixed (e.g., welded) to a frame 205. The fixed portions 208a-b-c of the three electrical linear actuators 206a-b-c are fixed to the frame 205 using bolts 207a-b. Actuators 206a-b-c may be thereby be removed and replaced. During use of the chair 100, there is no relative movement between the fixed portions 208a-b-c of the three electrical linear actuators 206a-b-c and the frame.

The linear directions of movement of each of the actuators 206a-b-c define three linear axes which are substantially vertical (i.e., perpendicular) with respect to the ground or floor on which the chair is installed.

The mobile portions 209a-b-c of the actuators 206a-b-c are connected to the seat base 102 using link members 300a-b-c. In the embodiment shown in FIG. 2, the fixed portion 208a of the front actuators 206a is more distant from the ground than the fixed portions 208b-c of the two rear actuators 206b-c. This results in a rearward inclination of the seat base 102 when the actuators 206a-b-c are in their reference position. The inclination of the seat base 102 is useful in providing a natural seating position to the user.

The person skilled in the art will understand that electrical linear actuators 206a-b-c can be replaced by any linear actuators powered by any other types of energies such as hydraulic, pneumatic, or thermal.

The function of controller 210 is to receive motion signals from an encoder (not shown) and interpret and transform the motion signals into drive signals for driving each actuator 206a-b-c.

The controller 210, or another electronic device with a processor and memory (not shown), may include functionalities related to the maintenance of the actuators 206a-b-c. This includes saving data in memory for download and analysis. The types of data include: time since installation, time since new, time under power, accelerations induced to the chair over time, number of movie representations shown, etc.

Figure 3:
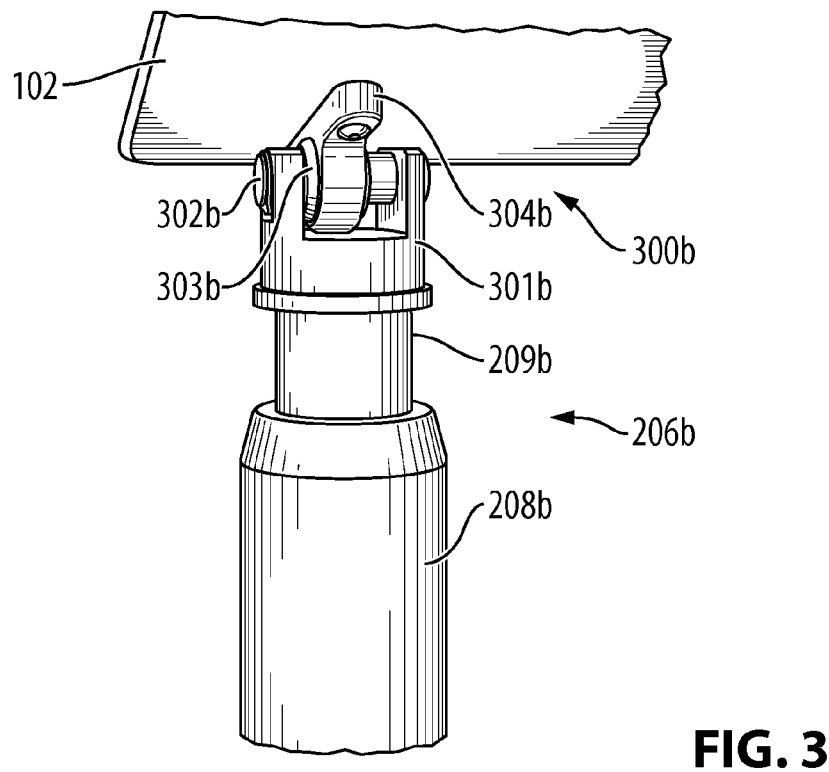
FIG. 3 is a perspective view of a rear link member according to an embodiment.
Figure 5:
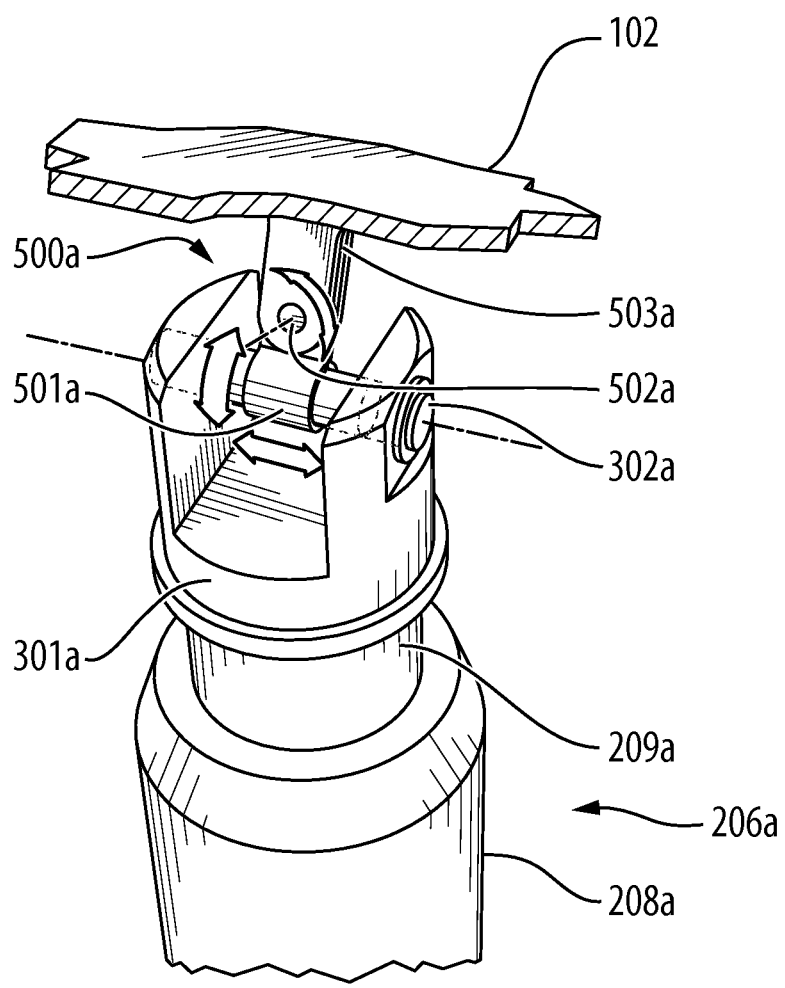
FIG. 5 is a perspective view of a front link member according to another embodiment.

Now referring to FIG. 3, there is shown the link member 300b between the actuator 206b and the seat base 102 located at the right rear corner of the seat base 102. The link member 300b comprises an eye connector 304b mounted on a ball 303b having a hole for admitting a shaft 302b therethrough. The eye connector 304b is screwed into the seat base 102. The ball 303b provides three rotational degrees of freedom. A person skilled in the art will understand that only two of the three rotational degrees of freedom could be used. An embodiment where only two rotational degrees of freedom are present is shown in FIG. 5.

The shaft 302b is mounted on a cradle 301b attached to the mobile portion 209b of the actuator 206b. The ball 303b is free to move on the shaft 302b. The movement of the ball 303b on the shaft 302b provides a translational degree of freedom along a longitudinal axis of the shaft 302b.

The longitudinal axis of the shaft 302b is from right to left of the seat base 102 from the point of view of the user.

Figure 4:
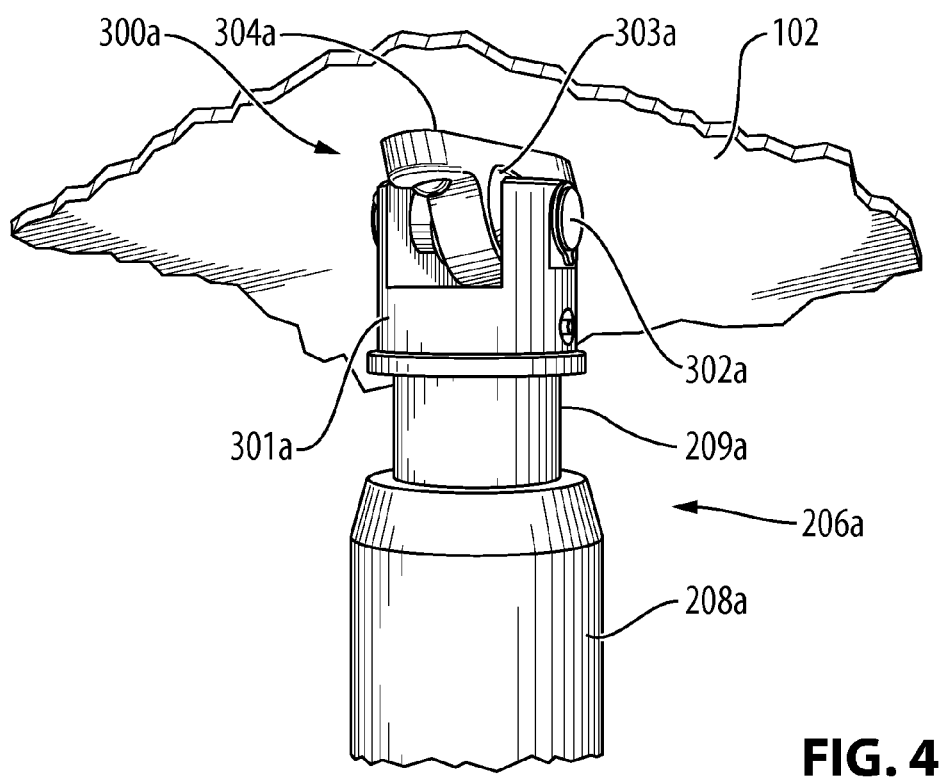
FIG. 4 is a perspective view of a front link member according to an embodiment.

Referring to FIG. 4, there is shown the link member 300a between the actuator 206a and the seat base 102 centered at the front of the seat base 102. The link member 300a comprises an eye connector 304a mounted on a ball 303a having a hole for admitting a shaft 302a therethrough. The eye connector 304a is screwed into the seat base 102. The ball 303a provides three rotational degrees of freedom.

The shaft 302a is mounted on a cradle 301a attached to the mobile portion 209a of the actuator 206a. The ball 303a is free to move on the shaft 302a. The movement of the ball 303a on the shaft 302a provides a translational degree of freedom along a longitudinal axis of the shaft 302a.

The longitudinal axis of the shaft 302a is from front to rear of the seat base from the point of view of the user. The actuator 206a is located in the middle of the front edge of the seat base 102 thereby providing free space on each side thereof for the legs of the user under the seat base 102.

The embodiment described is useful for inducing motion to a user in two rotational degrees of freedom to pitch and roll and in one translational up/down degree of freedom.

Other embodiments are possible where only two actuators are used at the back of the seat base 102 and one fixed point of contact is present forward of the two actuators. Other possible embodiments would include only one actuator, possibly at the front of the seat base 102, and one or more fixed point of contact, possibly at the back of the seat base 102.

Now referring to FIG. 5, there is shown another embodiment of a link member 500a. In FIG. 5, link member 500a is installed between the actuator 206a and the seat base 102. Other link members which may be installed at the rear of seat base 102 are not shown.

In an embodiment, link member 500a would be attached at the center forward of the middle of the seat base 102. The link member 500a comprises a connector 503a mounted on a pivot joint 502a forming part of a sliding ring 501a for admitting a shaft 302a therethrough. The connector 503a is screwed into the seat base 102. The link member 500a provides two rotational degrees of freedom as shown by the curved arrows.

The shaft 302a is mounted on a cradle 301a attached to the mobile portion 209a of the actuator 206a. The sliding ring 501a is free to move on the shaft 302a. The movement of the sliding ring 501a on the shaft 302a provides a translational degree of freedom along a longitudinal axis of the shaft 302a.

Figure 6:
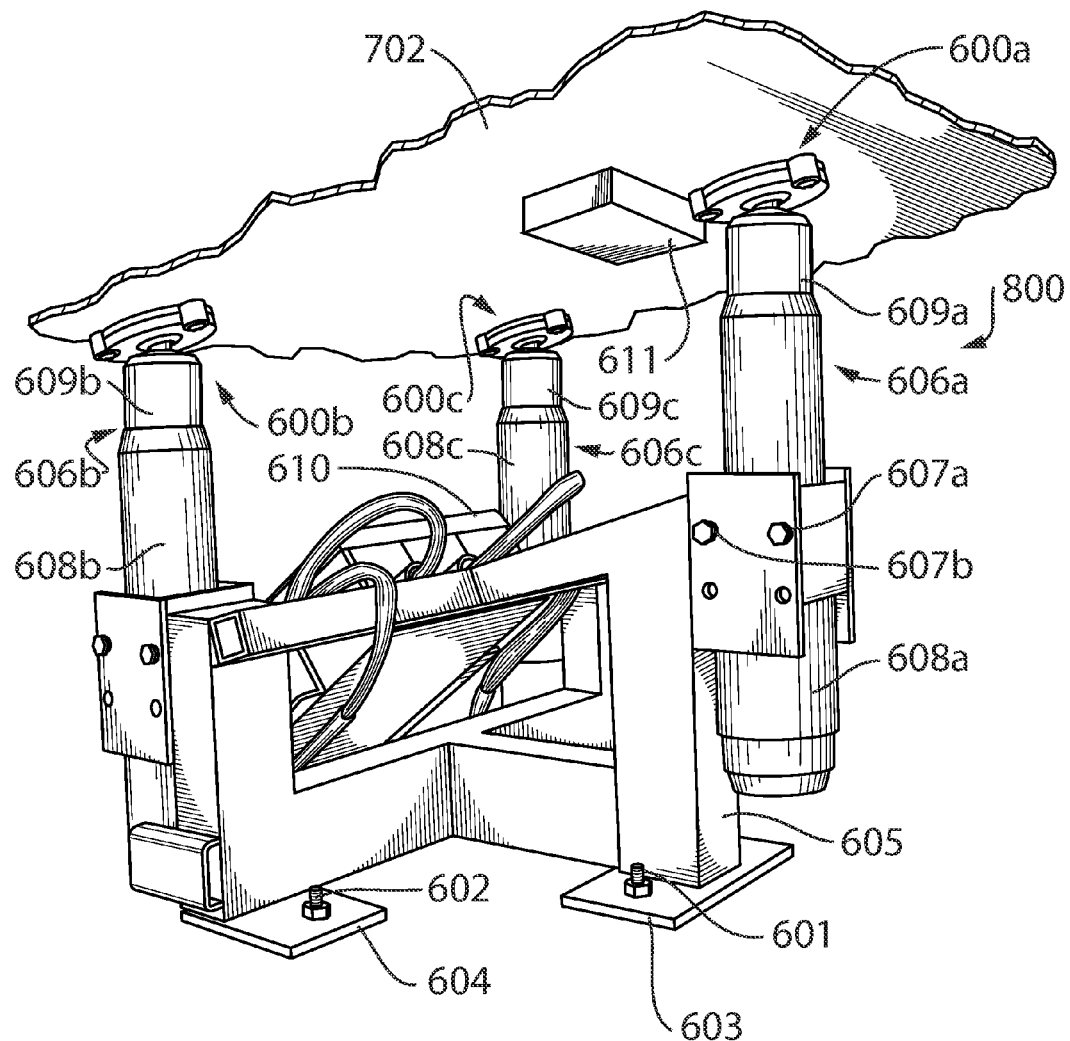
FIG. 6 is a perspective view of an actuated base according to another embodiment.

Now referring to FIG. 6, there is shown an actuating base 800 anchored to the floor using bolts 601-602 via anchor points (not visible) through anchor plates 603-604 (and another anchor plate which is not visible). Anchor plates 603-604 are fixed (e.g., welded) to a frame 605. The fixed portions 608a-b-c of the three linear actuators 606a-b-c are fixed to the frame 605 using bolts 607a-b. Actuators 606a-b-c may be thereby be removed and replaced. During use of the chair, there is no relative movement between the fixed portions 608a-b-c of the three linear actuators 606a-b-c and the frame.

The linear directions of movement of each of the actuators 606a-b-c define three linear axes which are substantially vertical; i.e., projecting upward from the gravity field even on inclined ground.

The mobile portions 609a-b-c of the actuators 606a-b-c are connected to the seat base 702 using link members 600a-b-c. In the embodiment shown in FIG. 6, the fixed portion 608a of the front actuators 606a is more distant from the ground than the fixed portions 608b-c of the two rear actuators 606b-c. This results in a rearward inclination of the seat base 702 when the actuators 606a-b-c are in their reference position. The inclination of the seat base 702 is useful in providing a natural seating position to the user. According to another embodiment, all actuators are at the same level.

The person skilled in the art will understand that linear actuators 606a-b-c can be replaced by any linear actuators powered by any type of energy such as electrical, hydraulic, pneumatic or thermal energy.

The function of controller 610 is to receive motion signals from an encoder (not shown) and interpret and transform the motion signals into drive signals for driving each actuator 606a-b-c.

The controller 610, or another electronic device with a processor and memory (not shown), may include functionalities related to the maintenance of the actuators 606a-b-c. This includes saving data in memory for download and analysis. The types of data include: time since installation, time since new, time under power, accelerations induced to the chair over time, number of movie representations shown, etc.

It should be noted that sensor 611 is used in the same manner as sensor 208 of FIG. 2 and will not be further discussed here.

Figure 7:
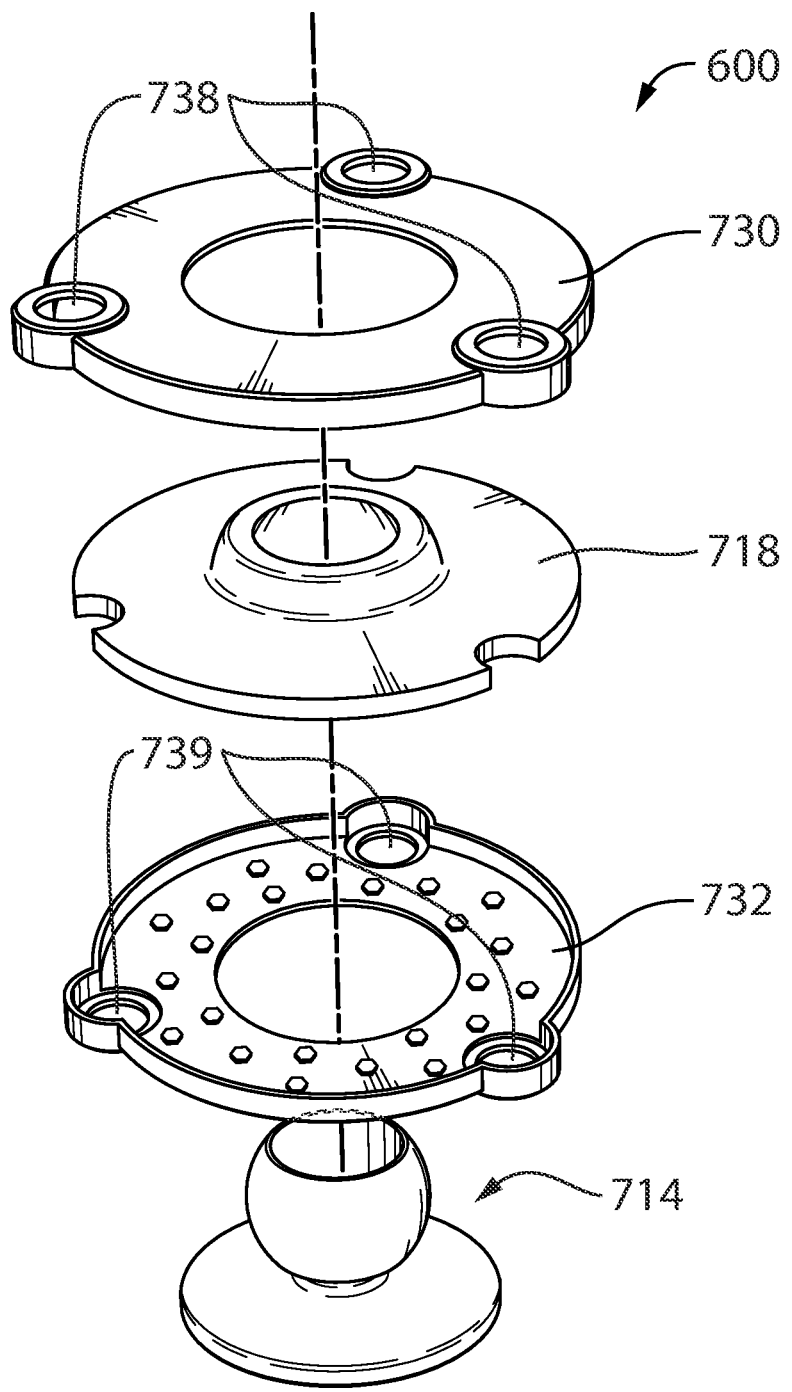
FIG. 7 is a perspective exploded view of a link member according to another embodiment and used with the actuated base of FIG. 6.
Figure 8:
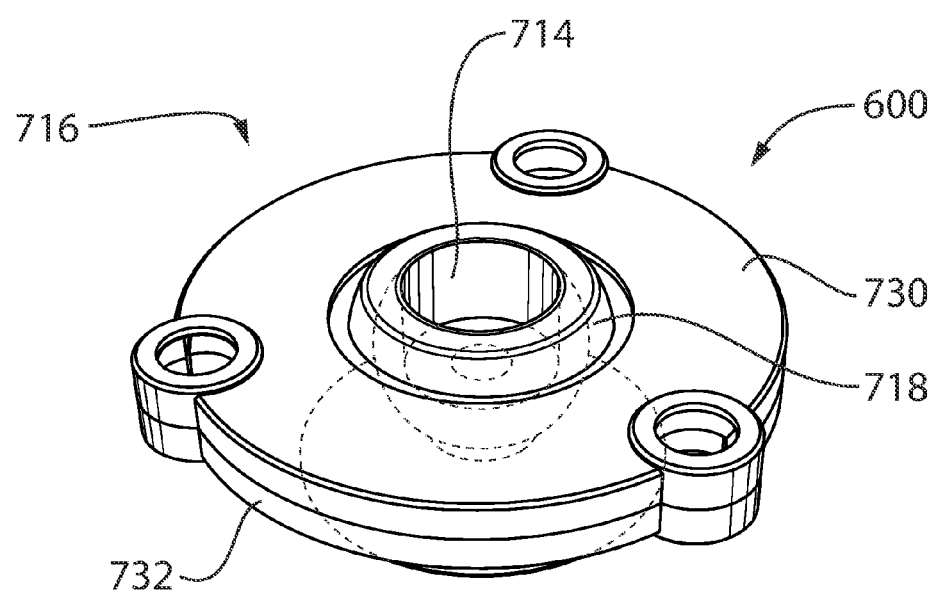
FIG. 8 is a perspective view of a link member of FIG. 7.

Now referring to FIGS. 7 and 8, there are shown respectively a perspective exploded view of one of the link members 600a-b-c (i.e., 600) and a perspective view of the link members 600a-b-c (i.e., 600) of the actuating base of FIG. 6. The link member 600 is for providing an interface between an actuator (i.e., one of actuators 606a, 606b, or 606c) and the seat base 702. Also, the link member 600 has at least one translational degree of freedom and at least two rotational degrees of freedom.

The link member 600 further comprises a joint member 714 to be attached to the actuator (i.e., one of actuators 606a, 606b, or 606c), a housing 716 to be attached to the seat base 702 and a slider 718 to be mounted on the joint member 714 and within the housing 716. The joint member 714 comprises a spherical surface 717 and a flange portion 715. The joint member may 714 may sometimes also be referred to as a ball. According to an embodiment, the housing 716 comprises a top cap 730 and a bottom cap 732 which are shown in more detail in FIGS. 10 and 11.

The slider 718 is free to move in a translational plane within the housing 716. This provides at least one translational degree of freedom. Also, the slider 718 is free to slide on the spherical surface 717 of the joint member 714 and to pivot about a first axis and a second axis. This provides at least two rotational degrees of freedom.

Generally, the slider 718 is free to move in more than one direction of the translational plane within the housing 716, thereby providing at least two translational degrees of freedom.

According to the embodiment shown in FIGS. 7 and 8, it is to be noted that the slider 718 is free to move in a translational plane within the housing 716 along a front-rear axis and left-right axis, thereby providing two translational degrees of freedom. Furthermore, the slider 718 is free to slide on the joint member 714 and to pivot about a pitch axis and a roll axis, thereby providing two rotational degrees of freedom.

According to an embodiment, the slider 718 is free to slide on the joint member and to pivot about a yaw (vertical) axis thereby providing a third rotational degree of degree of freedom.

It should be noted that although the link member 600 is shown in an application where it is the interface between a seat base 702 and an actuator, the link member 600 may generally provide the interface between any first part and second part which need to be interfaced with a translational degree of freedom and at least two rotational degrees of freedom. Furthermore, it is understood that the link member 600 can be installed in any other orientation. That is, the housing 716 can be attached to the actuator 606 while the joint member 714 can be attached to the seat base 702. In other applications, the link member 600 can be installed generally vertically; that is, for example, between a seat back and another substantially vertical surface.

Figures 9, 9A:
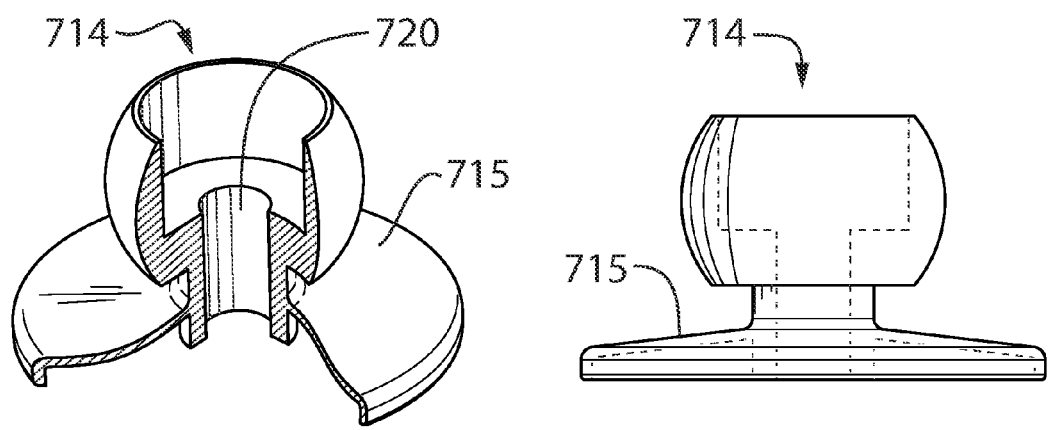
FIG. 9 is a perspective view of a joint member of the link member of FIG. 7.
FIG. 9A is a side view of a joint member of FIG. 9.

Now referring to FIGS. 9 and 9A, there is shown a perspective view of a joint member 714 of link member 600 of FIG. 8. In use, a joint fastening member 722 (FIG. 14) may be inserted through a hole 720 in the joint member 714 for attaching the joint member 714 to the actuator 606 (FIG. 6). The hole 720 has a given depth determined by the type of application in which the link member 600 is used.

Figure 10:
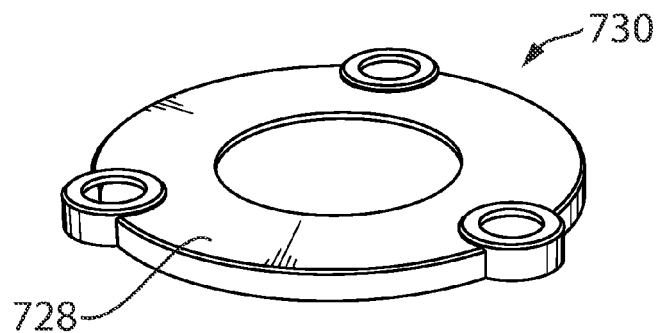
FIG. 10 is a perspective view of a top cap of a housing of the link member of FIG. 7.
Figure 11:
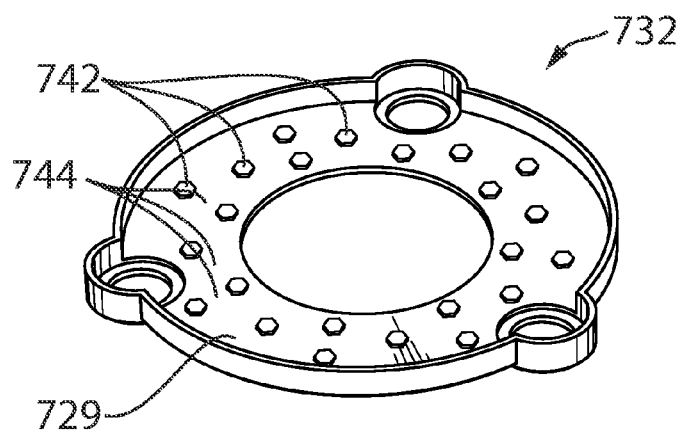
FIG. 11 is a perspective view of a bottom cap of a housing of the link member of FIG. 7.

Now referring to FIGS. 10 and 11 respectively, there is shown the top cap 730 and the bottom cap 732 of the housing 716 of link member 600 of FIG. 8. The housing 716 is adapted to be attached to the seat base 702 (FIG. 6). The top cap 730 and the bottom cap 732 of the housing 716 include substantially planar and circular sections 728 and 729. The bottom cap 732 also includes bumps 742 which create voids 744 therebetween. Although not shown, the top cap 730 may comprise a similar configuration of bumps and voids. This configuration facilitates the sliding of the slider 718 between the top cap 730 and the bottom cap 732.

Figures 12, 12A:
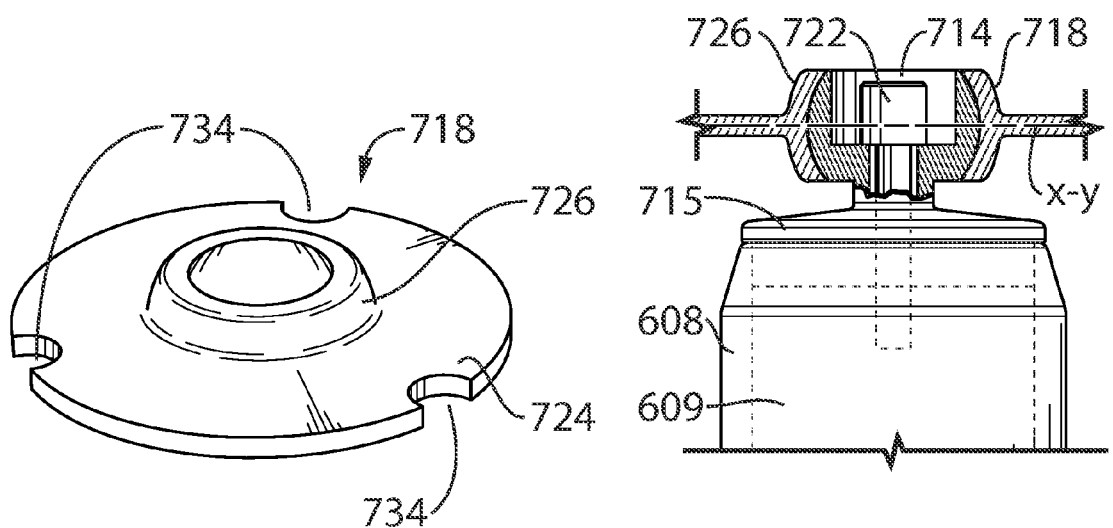
FIG. 12 is a perspective view of a slider of the link member of FIG. 7.
FIG. 12A is a partial cut-out side view of the link member of FIG. 12.

Now referring to FIG. 12, there is shown a perspective view of the slider 718 of the link member 600 of FIG. 8. The slider 718 is to be mounted on the joint member 714 and within the housing 716 (FIG. 8). The slider 718 includes a substantially planar slider section 724 and a substantially concave section 726. The substantially planar slider section 724 of the slider 718 is adapted to move in the translational plane within the housing 716 between the substantially planar and circular sections 728 and 729 of housing 716.

The substantially planar slider section 724 is well adapted to provide two translational degrees of freedom discussed above. A person skilled in the art will understand that other shapes would be appropriate for achieving this function. According to an embodiment where only one translational degree of freedom is required, a planar rectangular section could be appropriate.

The substantially concave section 726 of the slider 718 is adapted to receive the joint member 714. It is to be noted that the substantially planar slider section 724 of the slider 718 defines a linear plane x-y (FIG. 12A), where the joint member 714 may be centered with the linear plane x-y of the substantially concave section 726 of the slider 718.

Referring to FIG. 12, the slider includes three arch portions 734 in the substantially planar slider section 724. The arch portions 734 are equally spaced along the periphery of the substantially planar slider section 724 of the slider 718. The utility of the arch portions 734 are discussed below. In other embodiments, the configuration of the arch portions could be specifically unequally spaced to provide a specific alignment of the translational degree of freedom. This would be useful in embodiments where one translational degree of freedom is necessary along the substantially planar slider section 724.

Referring to FIG. 12A, the substantially planar slider section 724 of the slider 718 defines a linear plane and the joint member 714 is centered within the linear plane such that the translational and rotational axes cross at the same point.

Figure 14:
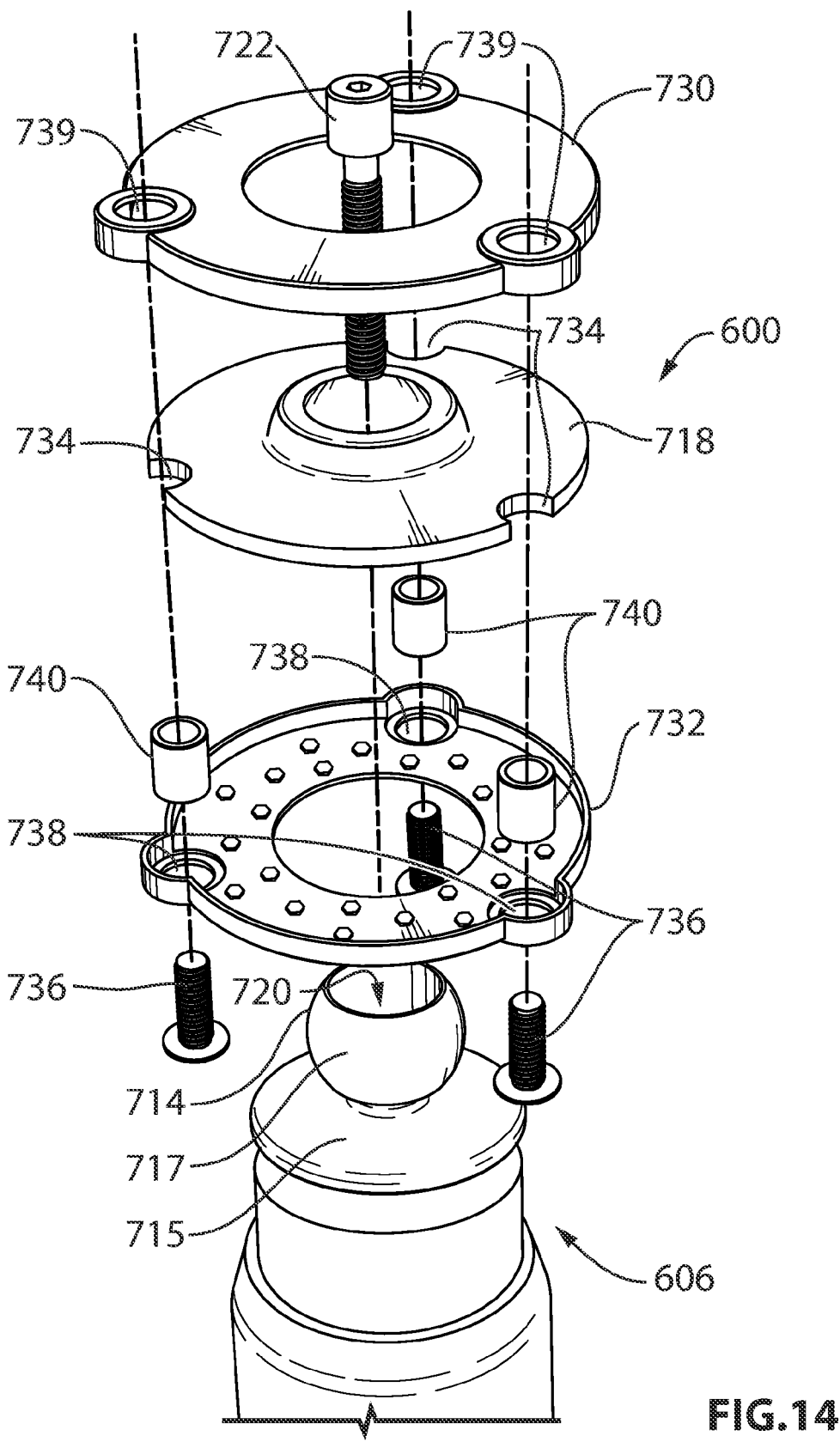
FIG. 14 is an exploded perspective view of the link member of FIG. 7 interfaced with an actuator.

FIG. 12A also shows a joint fastening member 722 which may be used for attaching the joint member 714 to the actuator 606 (see FIG. 14). The joint fastening member 722 may comprise, without limitations, one of a screw, a bolt, a shoulder screw, a pin, a cap screw, a socket cap screw, an eye bolt or a stud.

In an embodiment where the joint fastening member 722 allows for vertical movement such as with a shoulder screw, a third translational degree of freedom is provided. This degree of freedom allows for slight movement of the mobile portion 609 of the actuator 606 relative to the joint member 714. It should be noted that joint member 714 comprises a flange portion 715 which may be larger than mobile portion 609 to be supported by the fixed portion 608. This provides the advantage of reducing the load on the mobile portion 609 when actuator 606 is at its lowest position.

Figure 13:
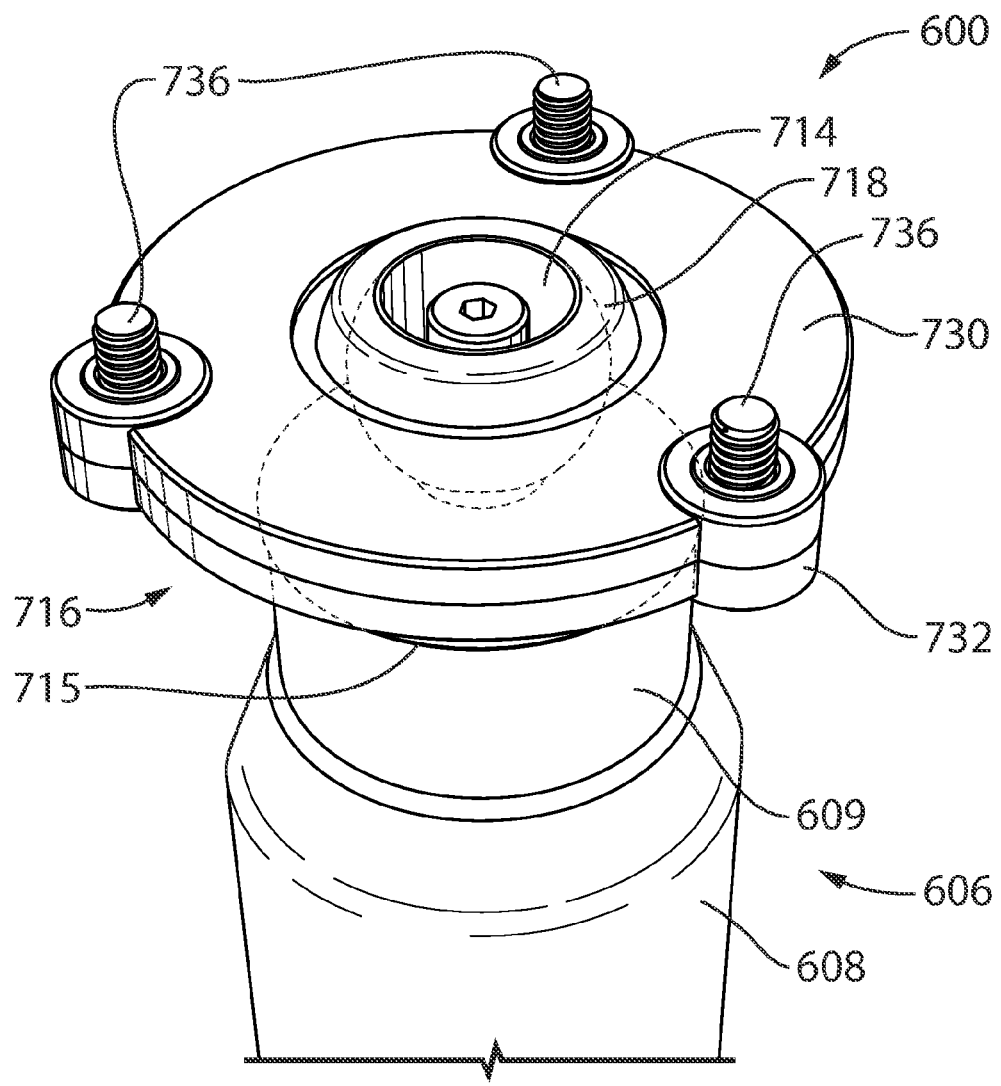
FIG. 13 is a perspective view of the link member of FIG. 7 interfaced with an actuator according to an embodiment.

Now referring to FIGS. 13 and 14, there are respectively shown a perspective view and an exploded perspective view of the link member 600 interfaced with an actuator 606. The link member 600 is for providing an interface between the actuator 606 and the seat base 702 (FIG. 6). Also, the link member 600 has at least one translational degree of freedom and at least one rotational degree of freedom.

The link member 600 further comprises a joint member 714 to be attached to the actuator 606, a housing 716 to be attached to the seat base 702 and a slider 718 to be mounted on the joint member 714 and within the housing 716.

In FIGS. 13 and 14, there is shown the joint member 714, which includes a hole 720 through which a joint fastening member 722 may be inserted for attaching the joint member 714 to the actuator 606.

According to an embodiment, the link member 600 further comprises seat fastening members 736 for attaching the housing 716 to the seat base 702 (see FIG. 6). There is also shown that the arch portions 734 and the corresponding housing openings 738 and 739 are adapted to admit the seat fastening members 736 for attaching the housing 716, i.e., the top cap 730 and the bottom cap 732, to the seat base 702. The seat fastening members 736 may comprise, without limitations, at least one of screws, bolts, shoulder screws, pins, cap screws, socket cap screws, eye bolts and studs. A sleeve 740 is provided for each one of the seat fastening members 736.

While preferred embodiments of the invention have been described above and illustrated in the accompanying drawings, it will be evident to those skilled in the art that modifications may be made therein without departing from the essence of this invention. Such modifications are considered as possible variants comprised in the scope of the invention.

The invention claimed is:

1. A link member for providing an interface between an actuator and a seat base, the link member has at least one translational degree of freedom and at least two rotational degrees of freedom, the link member comprising:
   a joint member having a spherical surface portion, the joint member for attachment to one of the actuator and the seat base;
   a housing for attachment to the other one of the actuator and the seat base; and
   a slider mounted on the spherical surface portion and within the housing;
   wherein the slider is free to move in a direction of a translational plane within the housing thereby providing the at least one translational degree of freedom and further wherein the slider is free to slide on the spherical surface portion and to pivot about a first axis and a second axis thereby providing the at least two rotational degrees of freedom.

2. The link member of claim 1, wherein the first axis provides pitch movement and second axis provides roll movement to the seat base.

3. The link member of claim 1, wherein the slider is free to move in more than one direction of the translational plane within the housing, thereby providing the at least two translational degrees of freedom.

4. The link member of claim 1, further comprising a joint fastening member and wherein the joint member comprises a hole therethrough for inserting the joint fastening member used for attaching the joint member to one of the actuator and the seat base.

5. The link member of claim 4, wherein the joint fastening member comprises one of a screw, a bolt, a shoulder screw, a pin, a cap screw, a socket cap screw, an eye bolt, and a stud.

6. The link member of claim 4, wherein the hole has a given depth and the joint fastening member comprises a shoulder screw which is longer than the given depth thereby providing an axial translational degree of freedom along the axial direction of the shoulder screw.

7. The link member of claim 1, wherein the slider comprises a substantially planar slider section adapted to move in the translational plane within the housing.

8. The link member of claim 1, wherein a crossing of the first axis and the second axis is within the translational plane.

9. The link member of claim 1, wherein the housing comprises a top cap and a bottom cap.

10. The link member of claim 9, wherein the top cap and the bottom cap each comprises a substantially planar cap section and wherein the slider comprises a substantially planar slider section adapted to slide between the top cap and the bottom cap.

11. The link member of claim 10, wherein at least one of the substantially planar cap sections comprises a surface having voids for facilitating the sliding between the top cap and the bottom cap.

12. The link member of claim 1, further comprising at least one seat fastening member for attaching the housing to the other of the actuator and the seat base wherein the housing comprises at least one housing opening which is adapted to admit the at least one seat fastening member therethrough.

13. The link member of claim 12, wherein the slider comprises at least one slider opening which corresponds to the at least one housing opening and which is adapted to allow clearance for the at least one fastening member.

14. The link member of claim 12, wherein the at least one seat fastening member comprises at least one of a screw, a bolt, a shoulder screw, a pin, a cap screw, a socket cap screw, an eye bolt, and a stud.

15. A link member for providing an interface between a first part and a second part, the link member has at least one translational degree of freedom and at least two rotational degrees of freedom, the link member comprising:
   a joint member having a spherical surface portion, the joint member for attachment to the first part;
   a slider mounted on the spherical surface; and
   a housing for attachment to the second part, the housing receiving at least partially the slider and the spherical surface portion therein;
   wherein the slider is free to move in a direction of a translational plane within the housing thereby providing the at least one translational degree of freedom and further wherein the slider is free to slide on the spherical surface portion and to pivot about a first axis and a second axis thereby providing the two rotational degrees of freedom.

16. The link member of claim 15, wherein a crossing of the first axis and the second axis is within the translational plane.

* * * * *